(12) United States Patent
Cho et al.

(10) Patent No.: US 10,546,494 B2
(45) Date of Patent: Jan. 28, 2020

(54) AUTOMOBILE ACCIDENT DETECTION AND NOTIFICATION

(71) Applicant: Eaton Intelligent Power Limited, Dublin (IE)

(72) Inventors: Nam Chin Cho, Peachtree City, GA (US); Parth Joshi, Sugar Hill, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/109,101

(22) Filed: Aug. 22, 2018

(65) Prior Publication Data

US 2019/0066497 A1   Feb. 28, 2019

Related U.S. Application Data

(60) Provisional application No. 62/549,296, filed on Aug. 23, 2017.

(51) Int. Cl.
| | | |
|---|---|---|
| *G08G 1/095* | (2006.01) | |
| *H04W 4/46* | (2018.01) | |
| *F21W 131/103* | (2006.01) | |
| *F21W 111/02* | (2006.01) | |
| *F21S 8/08* | (2006.01) | |

(52) U.S. Cl.
CPC ............. *G08G 1/095* (2013.01); *F21S 8/085* (2013.01); *F21W 2111/02* (2013.01); *F21W 2131/103* (2013.01); *H04W 4/46* (2018.02)

(58) Field of Classification Search
CPC ..................................................... G08G 1/07; G08G 1/09; G08G 1/093; G08G 1/095; G08G 1/0967; G08G 1/0104; G08G 1/0116; G08G 21/00; F21S 8/086; H05B 37/0227; H04W 4/46
USPC ................................ 340/692, 907, 928, 933
See application file for complete search history.

(56) References Cited

U.S. PATENT DOCUMENTS

| | | | | |
|---|---|---|---|---|
| 8,188,878 | B2 * | 5/2012 | Pederson ........... | G07C 9/00158 340/815.45 |
| 2009/0033504 | A1 * | 2/2009 | Tsai ..................... | G08B 3/10 340/584 |
| 2014/0176347 | A1 * | 6/2014 | Kim .................. | G08G 1/096716 340/907 |
| 2015/0339919 | A1 * | 11/2015 | Barnett ................ | G08G 1/0116 340/907 |
| 2016/0131358 | A1 * | 5/2016 | Spiro .................... | H04W 88/08 455/561 |

* cited by examiner

*Primary Examiner* — Hung T Nguyen
(74) *Attorney, Agent, or Firm* — King & Spalding LLP

(57) ABSTRACT

A street light fixture includes an audio sensor configured to detect a sound and to generate an electrical signal from the sound. The street light fixture further includes a controller configured to determine whether the sound is produced by an automobile accident based on the electrical signal. The street light fixture further includes a light source configured to provide a visual notification of the automobile accident in response to the controller determining that the sound is produced by the automobile accident.

20 Claims, 6 Drawing Sheets

US 10,546,494 B2

AUTOMOBILE ACCIDENT DETECTION AND NOTIFICATION

CROSS REFERENCE TO RELATED APPLICATIONS

The present application claims priority under 35 U.S.C. Section 119(e) to U.S. Provisional Patent Application No. 62/549,296, filed Aug. 23, 2017 and titled "Automobile Accident Detection And Notification," the entire content of which is incorporated herein by reference.

TECHNICAL FIELD

The present disclosure relates generally to automobile accident detection, and more particularly to automobile accident detection and notification capability integrated into outdoor light fixtures.

BACKGROUND

Automobile accidents are common occurrences. When an automobile accident occurs, there may be a need to contact the police and/or emergency service providers such as an emergency medical service provider and a fire department. The individuals involved in an accident can call the police and emergency service providers. Others that witnessed the accident also call the police and emergency service providers. However, in some cases, the people involved in an accident may be too injured to call, and others may also fail to contact the police and emergency service providers for a number of reasons. Further, when one automobile accident occurs, other subsequent accidents may follow as a result of the first accident and the lack of early notification. A traffic jam may also result from the accident because of the lack of early notification of the accident to enable other drivers to take different routes. Thus, in some cases, a solution that provides notifications of automobile accidents to other drivers as well as to police and emergency service providers is desirable.

SUMMARY

The present disclosure relates generally to automobile accident detection, and more particularly to automobile accident detection and notification integrated into outdoor light fixtures. In an example embodiment, a street light fixture includes an audio sensor configured to detect a sound and to generate an electrical signal from the sound. The street light fixture further includes a controller configured to determine whether the sound is produced by an automobile accident based on the electrical signal. The street light fixture further includes a light source configured to provide a visual notification of the automobile accident in response to the controller determining that the sound is produced by the automobile accident.

In another example embodiment, a street light fixture includes a light source and a receiver configured to receive one or more incoming wireless signals that are compliant with a vehicle-to-vehicle communication standard, where the one or more incoming wireless signals include a vehicle-to-vehicle message. The street light fixture further includes a controller configured to control the light source and to determine whether the vehicle-to-vehicle message indicates an occurrence of an automobile accident. The street light fixture also includes a transmitter configured to transmit a notification message using one or more outgoing wireless signals compliant with the vehicle-to-vehicle communication standard in response to the controller determining that the vehicle-to-vehicle message indicates the occurrence of the automobile accident.

In another example embodiment, a street light fixture includes a light source and an audio sensor configured to detect a sound and to generate an electrical signal from the sound. The street light fixture further includes a controller configured to control the light source, to receive the electrical signal from the audio sensor, and to determine whether the sound is produced by an automobile accident based on the electrical signal. The street light fixture also includes a transceiver configured to transmit one or more wireless signals, where the controller is configured to send a notification message via the transceiver in response to the controller determining that the sound is produced by the automobile accident.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
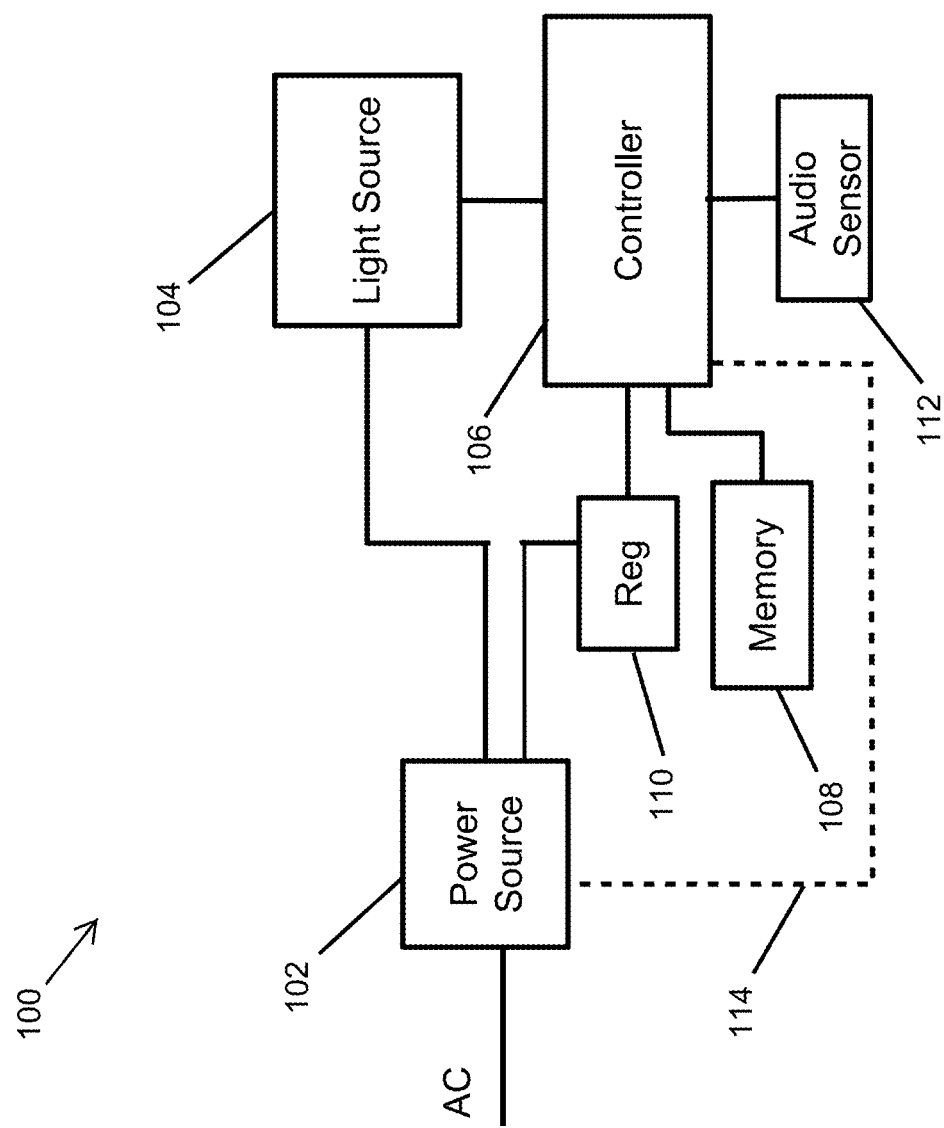
FIG. 1 illustrates a light fixture that detects automobile accidents and provides a notification of the accident according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different figures may designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Turning now to the figures, example embodiments are described. FIG. 1 illustrates a light fixture 100 that detects automobile accidents and provides a notification of the accident according to an example embodiment. For example, the light fixture 100 may be a street light fixture. In some example embodiments, the light fixture 100 includes a power source 102, a light source 104, a controller 106, and an audio sensor 112. The light fixture 100 may also include a memory device 108 and a voltage regulator 110.

In some example embodiments, the power source 102 may receive AC power and generate power compatible with the light source 104. For example, the power source 102 may generate DC power that provides a constant current to the light source 104. The power source 102 may also generate the DC power at a voltage level that is compatible with the light source 104. In some example embodiments, the light source 104 may include one or more discrete LEDs, one or more organic LEDs (OLEDs), an LED chip on board that includes one or more discrete LEDs, and/or an array of discrete LEDs. In some alternative embodiments, the light source 104 may include another type of light source without departing from the scope of this disclosure.

In some example embodiments, the power source 102 may also provide power to the regulator 110. The regulator may generate one or more power signals to provide power compatible with the controller 106 and other components of the light fixture 100. In some alternative embodiments, the regulator 110 may be integrated in the power source 102 or may be omitted. For example, the power source 102 may be a multi-channel power source that provides multiple power signals that are compatible with multiple components of the light fixture 100.

In some example embodiments, the audio sensor 112 may be a sound transducer that receives sound and generates an electrical signal that is provided to the controller 106. For example, the audio sensor 112 may include one or more microphones. To illustrate, the audio sensor 112 may include an array of microphones that are located at different locations in the lighting fixture 100 to more effectively receive sounds. The microphones may be analog or digital microphones.

In some example embodiments, the controller 106 may include a microcontroller or a microprocessor. The controller 106 may execute software code that is stored in the memory device 108 to perform the operations of the controller 106. For example, the memory device 108 may be a non-volatile memory device (e.g., flash memory), that is used to store software code as well as data used and/or generated by the controller 106. In some alternative embodiments, the memory device 108 may be integrated in the controller 106 without departing from the scope of this disclosure.

In some example embodiments, the controller may determine whether a sound received or detected by the audio sensor 112 is produced by an automobile accident. For example, the controller 106 may compare a sound received or detected by the audio sensor 112 against one or more sounds that are known to be produced by car accidents. The one or more sounds that are known to result from car accidents may be stored in the memory device 108. To illustrate, the controller 106 may compare the electrical signal from the audio sensor 112 against audio data stored in the memory device 108 to perform the comparison. For example, the controller 106 may perform signal processing operations to determine whether the received sound corresponds to a stored sound as can be readily understood by those of ordinary skill in the art with the benefit of this disclosure. If the controller 106 determines that the sound received by the audio sensor 112 resulted from an automobile accident, the lighting fixture 100 may provide a visual notification. For example, the controller 106 may control the light source 104 to provide the visual notification.

In some example embodiments, the controller 106 may control the light source 104 to flash the light emitted by the light source 104, to emit a particular color light (e.g., red light), etc. For example, the light source 104 may include multiple groups of LEDs, where the current through one or more of the groups of LEDs is controllable by the controller 106. To illustrate, the controller 106 may output one or more controls signals that control one or more transistors that are coupled to one or more groups of LEDs to control current flow through the one or more groups of LEDs. The controller 106 may control current flow through one or more of the groups of LEDs by turning on or off the transistors using the control signals.

By providing visual notification, such as flashing a light and/or emitting a light that has a particular color, other drivers may be alerted to slow down, which may avoid further accidents. Other drivers may also take alternate routes after noticing the visual notification, which may result in reducing the extent of the traffic that results from the accident. The visual notification may also indicate a reasonably accurate location of the accident for police and other emergency responders.

In some alternative embodiments, the lighting fixture 100 may include other components without departing from the scope of this disclosure. In some alternative embodiments, some of the components of the lighting fixture 100 may be integrated into a single component without departing from the scope of this disclosure. In some alternative embodiments, one or more of the components of the lighting fixture 100 may be omitted without departing from the scope of this disclosure. In some alternative embodiments, the controller 108 may control the power source 102 to control the power provided to the light source 104 in order to provide the visual notification, for example, by turning on and off the power provided to the light source 104. For example, the controller 108 may control the power source 102 via an electrical connection 114.

Figure 2:
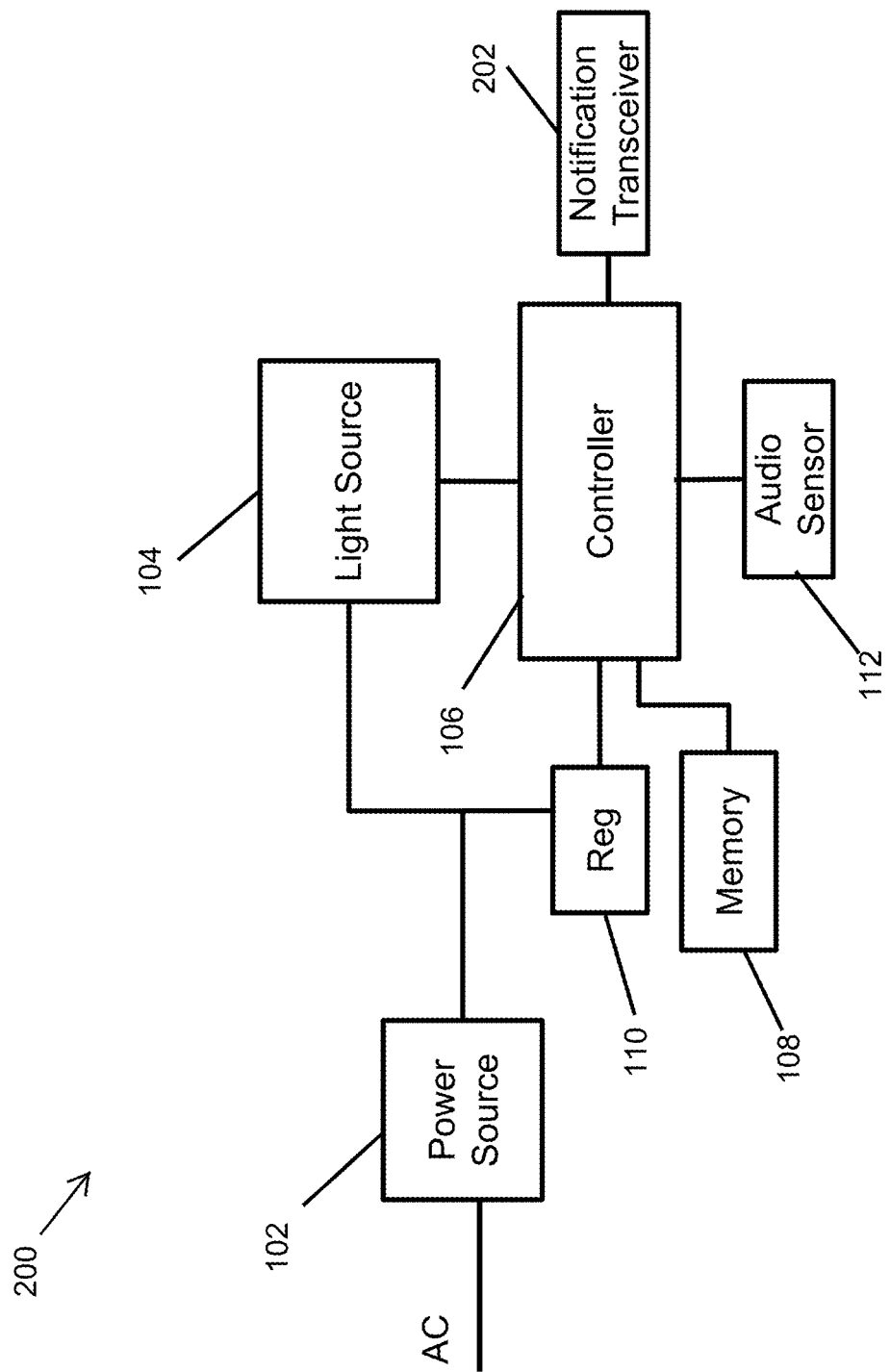
FIG. 2 illustrates a light fixture that detects automobile accidents and provides a notification of the accident according to another example embodiment.

FIG. 2 illustrates a light fixture 200 that detects automobile accidents and provides a notification of the accident according to another example embodiment. For example, the light fixture 200 may be a street light fixture. In some example embodiments, the light fixture 200 corresponds to the light fixture 100 with the addition of a notification transceiver 202 (i.e., a transmitter and a receiver) and operates in a substantially similar manner as the light fixture 100. To illustrate, the light fixture 200 may include the power source 102, the light source 104, the controller 106, the memory device 108, the regulator 110, and the audio sensor 112. The power source 102 or the regulator 110 may provide power to the notification transceiver 202.

In some example embodiments, upon the controller 106 determining that the sound detected or received by the audio sensor 112 is produced by an automobile accident as described with respect to the lighting fixture 100, the controller 106 may send a notification message indicating the accident has occurred via the notification transceiver 202 instead of or in addition to controlling the light source 104 to provide a visual notification of the accident. For example, the controller 106 can send the notification message using a wireless signal that is compliant with a wide area wireless communication standard, such as GSM, CDMA, or another wireless communication standard.

To illustrate, the light fixture 200 may send a notification (e.g., an audio message, a text message, etc.) to one or more of a police department, a fire department, an emergency medical service provider, etc., for example, identifying the location of the light fixture 200. For example, the location may be provided as a GPS location, a street address, mile marker, etc. The location of the lighting fixture 200 may be stored in the memory device 108 or in another memory device during installation of the lighting fixture 200 or after installation, for example, by sending the location information wirelessly to the lighting fixture 100. The controller 106 may retrieve the location information from the memory device 108 and send the location information in or along with the accident notification message.

In some example embodiments, the controller 106 can send the notification message wirelessly to other light fixtures using the notification transceiver 202 or another transceiver. For example, one or more other light fixtures that are within a particular range of the light fixture 200 may receive the notification message and start providing visual (e.g., flashing their lights, emitting particular color lights, etc.) or other notifications that alert drivers of the accident and that may guide police and emergency service providers to the scene of the accident.

By providing the notification message wirelessly, the light fixture 200 enables quickly alerting the police and emergency service providers. In accidents involving people unable to contact the police or others themselves, the notification message may be a critical tool to get emergency help to the scene quickly, particularly when other people are not available to help.

In some alternative embodiments, the lighting fixture 200 may include other components without departing from the scope of this disclosure. In some alternative embodiments, some of the components of the lighting fixture 200 may be integrated into a single component without departing from the scope of this disclosure. In some alternative embodiments, one or more of the components of the lighting fixture 200 may be omitted without departing from the scope of this disclosure. In some alternative embodiments, the lighting fixture 200 may include a separate transmitter and a separate receiver instead of the notification transceiver 202. In some alternative embodiments, the lighting fixture 200 may include a transmitter instead of the notification transceiver 202.

Figure 3:
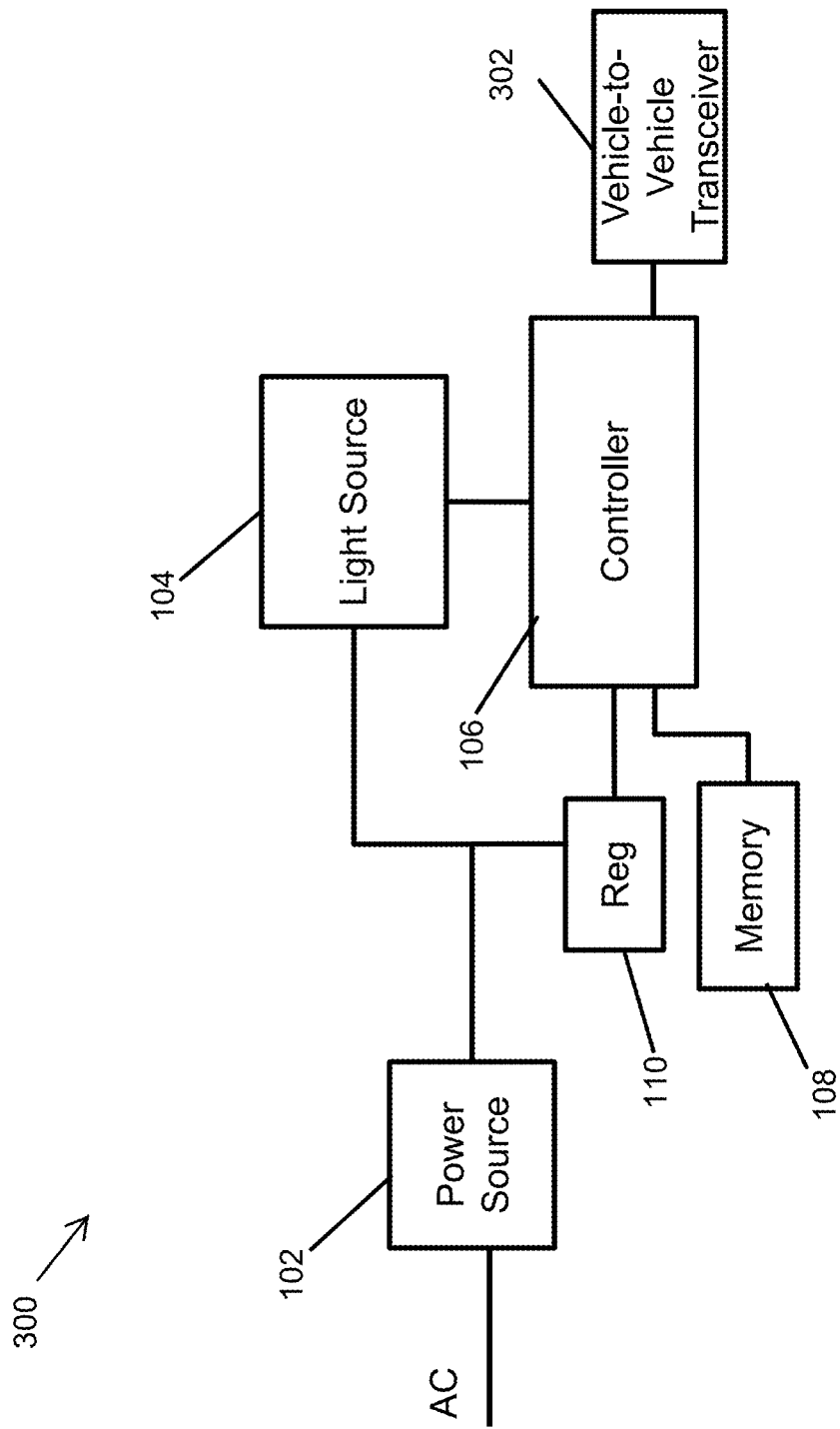
FIG. 3 illustrates a light fixture that detects automobile accidents and provides a notification of the accident according to another example embodiment.

FIG. 3 illustrates a light fixture 300 that detects automobile accidents and provides a notification of the accident according to another example embodiment. For example, the light fixture 300 may be a street light fixture. In some example embodiments, the light fixture 300 corresponds to the light fixture 100 with the addition of a notification transceiver 202 (i.e., a transmitter and a receiver) and operates in a substantially similar manner as the light fixture 100. To illustrate, the light fixture 300 may include the power source 102, the light source 104, the controller 106, the memory device 108, and the regulator 110 described above with respect to the light fixture 100. In some example embodiments, the light fixture 300 may also include a transceiver 302. The controller 106 may use the transceiver 302 to receive and transmit messages wirelessly according to a vehicle-to-vehicle communication protocol and compliant with a vehicle-to-vehicle communication standard, such as IEEE 802.11.p. The power source 102 or the regulator 110 may provide power to the transceiver 302.

In some example embodiments, a vehicle may send a message using wireless signals compliant with a vehicle-to-vehicle communication standard. For example, a vehicle that is involved in an automobile accident may send a message indicating the occurrence of the accident. To illustrate, the vehicle may have an accelerometer that detects abrupt changes in the speed of the vehicle. Alternatively, the vehicle may determine that the vehicle is involved in an accident using other means as can be contemplated by those of ordinary skill in the art with the benefit of this disclosure.

In some example embodiments, the controller 106 may receive wireless signals from a vehicle via the transceiver 302 and process a message included in the signals to determine whether the message indicates the occurrence of an accident. Upon determining from the message that an accident has occurred, the controller 106 may use the transceiver 302 to transmit to other vehicles one or more notification messages using wireless signals compliant with the vehicle-to-vehicle communication standard. The controller 106 may also control the light source 104 to provide a visual notification as described above with respect to FIGS. 1 and 2.

In some alternative embodiments, the lighting fixture 300 may include other components without departing from the scope of this disclosure. In some alternative embodiments, some of the components of the lighting fixture 300 may be integrated into a single component without departing from the scope of this disclosure. In some alternative embodiments, one or more of the components of the lighting fixture 300 may be omitted without departing from the scope of this disclosure. In some alternative embodiments, the lighting fixture 300 may include a separate transmitter and a separate receiver instead of the transceiver 302.

Figure 4:
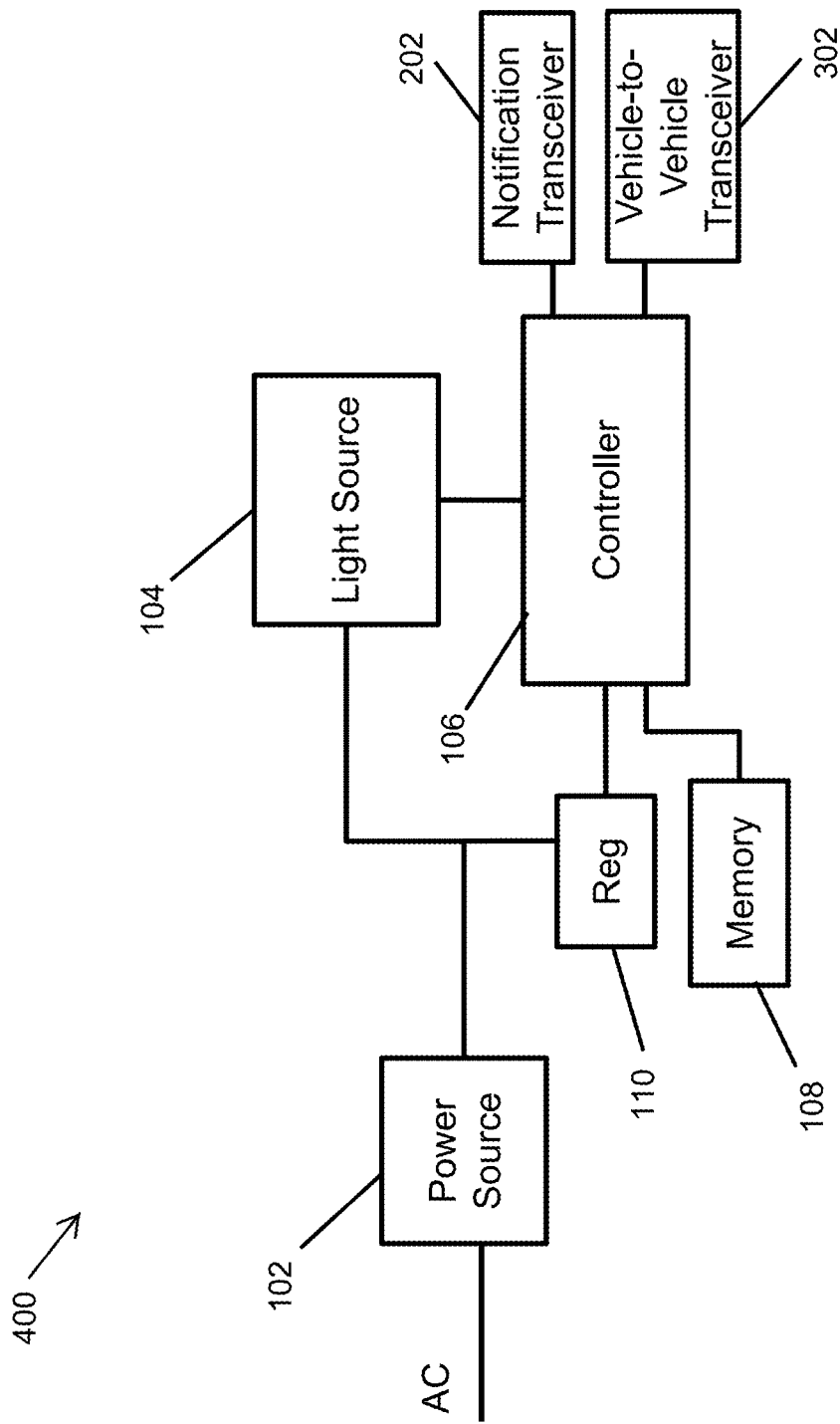
FIG. 4 illustrates a light fixture that detects automobile accidents and provides a notification of the accident according to another example embodiment.

FIG. 4 illustrates a light fixture 400 that detects automobile accidents and that provides a notification of the accident according to another example embodiment. For example, the light fixture 400 may be a street light fixture. In some example embodiments, the light fixture 400 corresponds to the light fixture 300 with the addition of the notification transceiver 202. The light fixture 400 operates in a substantially similar manner as the light fixtures 100, 200, and 300. To illustrate, the light fixture 400 may include the power source 102, the light source 104, the controller 106, the memory device 108, the regulator 110, and the transceiver 302.

In some example embodiments, upon the controller 106 determining that the message received from a vehicle via the transceiver 302 indicates the occurrence of an automobile accident, the controller 106 may send a notification message via the notification transceiver 202 indicating the occurrence of the accident in a similar manner as described with respect to the light fixture 200 of FIG. 2. In some example embodiments, the controller 106 may send a notification message via the notification transceiver 202 instead of or in addition to the controller 106 sending a notification message to other vehicles using the transceiver 302 as described with respect to the light fixture 300. In some example embodiments, the controller 106 may control the light source 104 to provide a visual notification of the accident as described with respect to the light fixture 100 in addition to sending a notification message via the transceiver 202 and a notification message via the transceiver 302.

In some alternative embodiments, the lighting fixture 400 may include other components without departing from the scope of this disclosure. In some alternative embodiments, some of the components of the lighting fixture 400 may be integrated into a single component without departing from the scope of this disclosure. In some alternative embodiments, one or more of the components of the lighting fixture 400 may be omitted without departing from the scope of this disclosure. In some alternative embodiments, the lighting fixture 400 may include a separate transmitter and a separate receiver instead of the transceiver 202 and/or 302. In some alternative embodiments, the lighting fixture 400 may include a transmitter instead of the notification transceiver 202.

Figure 5:
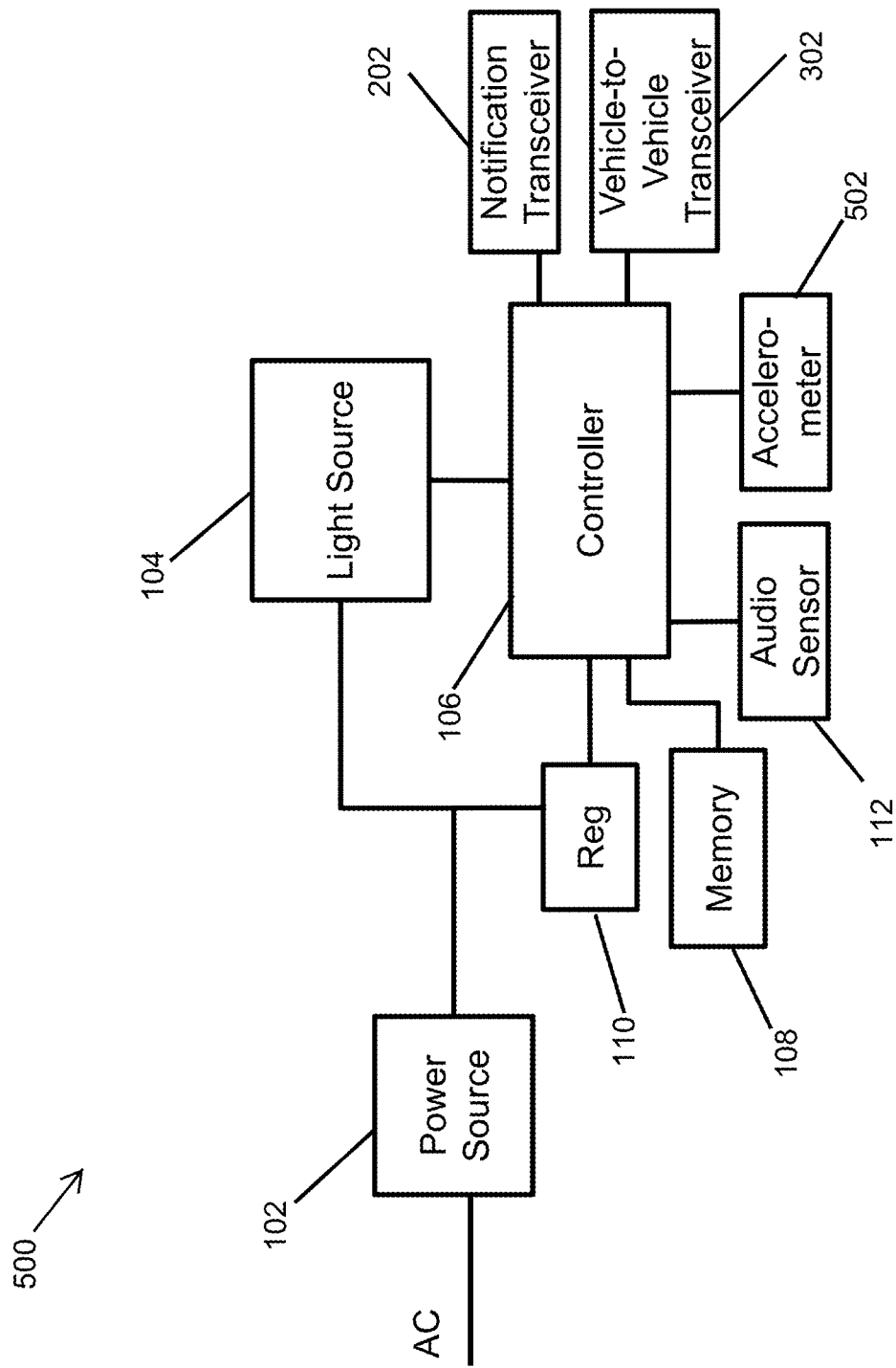
FIG. 5 illustrates a light fixture that detects automobile accidents and provides a notification of the accident according to another example embodiment.

FIG. 5 illustrates a light fixture 500 that detects automobile accidents and that provides a notification of the accident according to another example embodiment. For example, the light fixture 500 may be a street light fixture. In some example embodiments, the light fixture 500 may include the power source 102, the light source 104, the controller 106, the memory device 108, the regulator 110, the audio sensor 112, and the transceivers 202, 302 described above. The controller 106 may determine whether an accident had occurred and provide one or more notifications as described above with respect to FIGS. 1-4.

In some example embodiments, the light fixture 500 includes an accelerometer 502 that can detect some vibrations in the light fixture 500. The power source 102 or the regulator 110 may provide power to the accelerometer 502. The accelerometer 502 may detect vibrations of the light fixture 500 that may occur when the light fixture 500 is moved resulting from an accident. To illustrate, an automobile accident may be a single vehicle or a multi-vehicle crash that results in the light fixture 500 being shaken or otherwise damaged.

In some example embodiments, the accelerometer 502 may provide information to the controller 106 indicating that the light fixture 500 is damaged. The accelerometer 502 may also provide other information, such as information indicating vibrations in resulting from other causes such as wind, to the controller 106. The controller 106 may receive the information from the accelerometer 502 and determine whether the information indicates the occurrence of an accident. Upon determining that the information from the accelerometer 502 indicates the occurrence of an accident, the controller 106 may provide one or more notifications as described above with respect to FIGS. 1-4. In some alternative embodiments, the light fixture 500 may detect damage to the light fixture 500 caused by automobile accidents using other means without departing from the scope of this disclosure.

In some alternative embodiments, the lighting fixture 500 may include other components without departing from the scope of this disclosure. In some alternative embodiments, some of the components of the lighting fixture 500 may be integrated into a single component without departing from the scope of this disclosure. In some alternative embodiments, one or more of the components of the lighting fixture 500 may be omitted without departing from the scope of this disclosure. In some alternative embodiments, the lighting fixture 500 may include a separate transmitter and a separate receiver instead of the transceiver 202 and/or 302. In some alternative embodiments, the lighting fixture 500 may include a transmitter instead of the notification transceiver 202.

Figure 6:
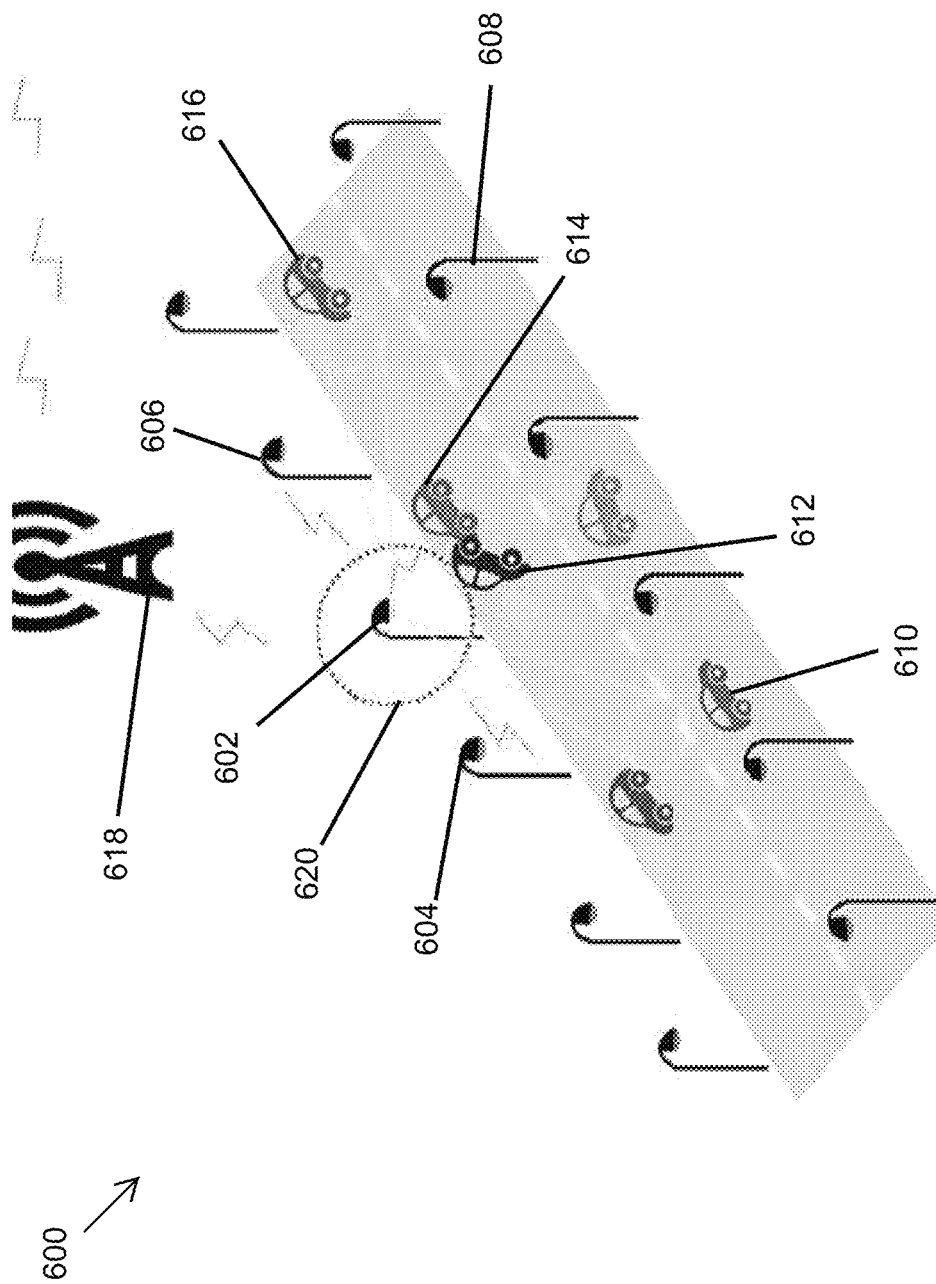
FIG. 6 illustrates a system of light fixtures that detect automobile accidents and provide notifications of the accidents according to an example embodiment.

FIG. 6 illustrates a system 600 of light fixtures that detect automobile accidents and provide notifications of the accidents according to an example embodiment. The system 600 may include multiple light fixtures including light fixtures 602, 604, 606, 608. The light fixtures 602, 604, 606, 608 may each correspond to one of the light fixtures 100-500 described above. In some example embodiments, the light fixture 602 may receive a sound resulting from the accident between vehicles 612 and 614. For example, the light fixture 602 may be close enough to the location of the accident to successfully receive the sound such that the light fixture 602 can process the sound to determine whether an accident has occurred. For example, the light fixture 602 may include the controller 106 described above with respect to the light fixtures 100-500 that can process the sound and determine whether the sound indicates an accident. In some example embodiments, the light fixtures 604-608 may be too far from the location of the accident to successfully receive the sound resulting from the accident.

In some example embodiments, the light fixture 602 may receive from the vehicle 612 a message, based on a vehicle-to-vehicle communication protocol, indicating that the respective vehicle 612 is involved in the automobile accident. For example, the light fixture 602 may receive a message transmitted by a vehicle that is within or close to a general boundary 620. In some example embodiments, the light fixture 602 may also receive a similar message from the vehicle 614 based on the vehicle-to-vehicle communication protocol. For example, the light fixture 602 may be close enough to the location of the accident to successfully receive the messages from one or both vehicles 612, 614, and the light fixtures 604-608 may be too far from the location of the accident to successfully receive the messages from the vehicles 612, 614. The light fixture 602 may determine whether the messages received from the vehicles 612, 614 indicate the occurrence of the accident in a similar manner as described above with respect to the light fixtures 100-500.

In some example embodiments, upon determining that an accident has occurred based on the sound generated by the accident, based on the message received from one or both of the vehicles 612 and 614, or other means, the light fixture 602 may provide a visual notification, such as a flashing light, a particular color light, etc. Alternatively or in addition, the light fixture 602 may send a notification message to nearby vehicles, such as the vehicles 610, 616, using vehicle-to-vehicle communication protocol. Alternatively or in addition, the light fixture 602 may send a notification message to other light fixtures, such as the light fixtures 604, 606, 608, and/or send a notification message, for example, via a tower 618, to the police, emergency service providers, etc. One or more of the light fixtures 604, 606, 608 may provide a visual notification in response to receiving the notification message from the light fixture 602. The notification message sent by the light fixture 602 to other vehicles, to other light fixtures, and/or via the tower 618 may include address information indicating the location of the light fixture 602, for example, as a street address, a GPS location, etc.

Visual notifications provided by the light fixture 602 and the other light fixtures 604-608 may help guide police and emergency service providers to the location of the automobile accident. The visual notifications may also help other drivers to take alternate routes. Notification messages sent to police, emergency service providers, etc., for example, via the tower 618 may result in help arriving quickly at accident locations. The notification messages sent to nearby vehicles by the light fixture 602 may help other drivers to take alternate routes.

In some alternative embodiments, the light fixture 602 may determine that the accident between vehicles 612 and 614 has occurred by other means as may be contemplated by those of ordinary skill in the art with the benefit of this disclosure. In some alternative embodiments, more than one light fixture may successfully receive a sound resulting from an automobile accident and provide visual and/or other notifications upon determining that the sound indicates the accident. In some alternative embodiments, more than one light fixture may successfully receive a message from a vehicle involved in an automobile accident and provide visual and/or other notifications upon determining that the message indicates the accident.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A street light fixture, comprising:
   an audio sensor configured to detect a sound and to generate an electrical signal from the sound;
   a controller configured to determine whether the sound is produced by an automobile accident based on the electrical signal;
   a light source configured to provide a visual notification of the automobile accident in response to the controller determining that the sound is produced by the automobile accident;
   a transmitter configured to transmit one or more wireless signals, wherein the controller is configured to send a notification message using the one or more wireless signals, wherein the notification message includes information indicating the automobile accident and a location of the street light fixture; and
   a power source device that provides power to the light source and the controller.

2. The street light fixture of claim 1, wherein the controller is configured to control the light source to generate the visual notification.

3. The street light fixture of claim 2, wherein the visual notification includes a flashing light emitted by the light source.

4. The street light fixture of claim 1, wherein the controller is configured to determine whether the sound is produced by the automobile accident by comparing the electrical signal received from the audio sensor against one or more stored audio data of sounds known to result from car accidents.

5. The street light fixture of claim 1, wherein the one or more wireless signals are compliant with a wireless wide area network communication standard.

6. The street light fixture of claim 5, wherein the controller is configured to send a second notification message to a second street light fixture via the transmitter in response to the controller determining that the sound is produced by the automobile accident.

7. The street light fixture of claim 1, wherein the one or more wireless signals are compliant with a vehicle-to-vehicle communication standard.

8. The street light fixture of claim 1, further comprising a receiver configured to receive wireless signals compliant with a vehicle-to-vehicle communication standard, wherein the controller is configured to receive a vehicle-to-vehicle message via the receiver and wherein the controller is configured to determine whether the vehicle-to-vehicle message indicates an occurrence of a second automobile accident.

9. The street light fixture of claim 8, wherein the light source is configured to provide a second visual notification of the second automobile accident in response to the controller determining that the vehicle-to-vehicle message indicates the occurrence of the second automobile accident.

10. The street light fixture of claim 1, wherein the power provided to the light source and the controller includes a first power provided to the light source and a second power provided to a regulator that generates a power signal that is provided to the controller.

11. A street light fixture, comprising:
    a light source;
    a receiver configured to receive one or more incoming wireless signals that are compliant with a vehicle-to-vehicle communication standard, wherein the one or more incoming wireless signals include a vehicle-to-vehicle message;
    a controller configured to control the light source and to determine whether the vehicle-to-vehicle message indicates an occurrence of an automobile accident;
    a first transmitter configured to transmit a first notification message using one or more outgoing wireless signals compliant with the vehicle-to-vehicle communication standard in response to the controller determining that the vehicle-to-vehicle message indicates the occurrence of the automobile accident; and
    a second transmitter configured to transmit a second notification message in response to the controller determining that the vehicle-to-vehicle message indicates the occurrence of the automobile accident, wherein the second notification message includes information indicating the occurrence of the automobile accident and a location of the street light fixture.

12. The street light fixture of claim 11, wherein the controller is configured to control the light source to generate a visual notification in response to the controller determining the vehicle-to-vehicle message indicates the occurrence of the automobile accident.

13. The street light fixture of claim 12, wherein the visual notification includes a flashing light emitted by the light source.

14. The street light fixture of claim 11, wherein the second transmitter is configured to transmit the second notification message using one or more second outgoing wireless signals compliant with a wireless wide area network communication standard.

15. The street light fixture of claim 11, further comprising a power source device that provides power to the light source and the controller.

16. A street light fixture, comprising:
    a light source;
    an audio sensor configured to detect a sound and to generate an electrical signal from the sound;
    a controller configured to control the light source, to receive the electrical signal from the audio sensor, and to determine whether the sound is produced by an automobile accident based on the electrical signal;
    a transceiver configured to transmit one or more wireless signals, wherein the controller is configured to send a notification message via the transceiver in response to the controller determining that the sound is produced by the automobile accident, wherein the notification message includes information indicating a location of the street light fixture; and
    a power source device that provides power to the light source and the controller.

17. The street light fixture of claim 16, wherein the transceiver is configured to transmit the notification message using the one or more wireless signals, wherein the one or more wireless signals are compliant with a wireless wide area network communication standard.

18. The street light fixture of claim 16, wherein the transceiver is configured to transmit the notification message using the one or more wireless signals, wherein the one or more wireless signals are compliant with a vehicle-to-vehicle communication standard.

19. The street light fixture of claim 16, wherein the controller is configured to control the light source to generate a visual notification in response to the controller determining that the sound is produced by the automobile accident.

20. The street light fixture of claim 16, wherein the power provided to the light source and the controller includes a first power provided to the light source and a second power provided to a regulator that generates a power signal that is provided to the controller.

\* \* \* \* \*